(12) United States Patent
Hamilton et al.

(10) Patent No.: US 8,106,774 B2
(45) Date of Patent: Jan. 31, 2012

(54) AUTOMOTIVE PARTS KIT DIFFERENTIATION SYSTEM

(75) Inventors: Jeffrey R. Hamilton, Davisburg, MI (US); James Justin Carty, Lavaca, AR (US); Jimmy Dean Kinder, Russellville, AR (US)

(73) Assignee: Cloyes Gear and Products, Inc., Fort Smith, AR (US)

( * ) Notice: Subject to any disclaimer, the term of this patent is extended or adjusted under 35 U.S.C. 154(b) by 455 days.

(21) Appl. No.: 11/716,326

(22) Filed: Mar. 9, 2007

(65) Prior Publication Data

US 2007/0246403 A1    Oct. 25, 2007

Related U.S. Application Data

(60) Provisional application No. 60/781,271, filed on Mar. 10, 2006.

(51) Int. Cl.
*G08B 23/00* (2006.01)

(52) U.S. Cl. ........... 340/572.1; 235/462.04; 235/462.08; 235/462.13

(58) Field of Classification Search ............. 340/10.1, 340/10.2, 10.3, 571.1, 571.2, 571.3, 571.4, 340/568.1, 572.1; 700/95, 115, 116, 215, 700/225, 218, 220, 221, 57, 56, 192; 364/468; 705/22; 382/141, 151; 235/462.04, 462.08, 235/462.13
See application file for complete search history.

(56) References Cited

U.S. PATENT DOCUMENTS

| | | | | |
|---|---|---|---|---|
| 4,180,284 A * | 12/1979 | Ashley | ............................ | 283/70 |
| 4,638,171 A * | 1/1987 | Gassmann | ................... | 250/566 |
| 5,869,820 A * | 2/1999 | Chen et al. | .................... | 235/376 |
| 6,077,598 A * | 6/2000 | Harper | ........................... | 428/220 |
| 6,685,477 B1 * | 2/2004 | Goldman et al. | ............. | 434/172 |
| 6,865,001 B2 * | 3/2005 | Long et al. | ......................... | 359/2 |
| 7,018,210 B2 * | 3/2006 | Goldman et al. | ............. | 434/172 |
| 7,028,890 B2 * | 4/2006 | Tani | .............................. | 235/380 |
| 7,040,663 B1 * | 5/2006 | Plaschka et al. | ................ | 283/72 |
| 7,445,152 B2 * | 11/2008 | Golabek et al. | .......... | 235/462.01 |
| 2004/0084520 A1 * | 5/2004 | Muehl et al. | ................... | 235/376 |
| 2004/0206810 A1 * | 10/2004 | Yamagiwa | .................... | 235/376 |
| 2006/0190342 A1 * | 8/2006 | Dendl et al. | .................... | 705/26 |
| 2007/0090951 A1 * | 4/2007 | Chan et al. | ................. | 340/572.1 |

* cited by examiner

*Primary Examiner* — Daniel Wu
*Assistant Examiner* — Rufus Point
(74) *Attorney, Agent, or Firm* — Fay Sharpe LLP

(57) ABSTRACT

An automotive parts kit differentiation system and method includes a plurality of different types of parts kits, wherein each type of kit includes a base and a plurality of automotive parts removably contained by the base. The parts contained in each type of kit vary as compared to each other type of kit. Each base includes a unique identifier tag that identifies the base as being a base for one of the plurality of kit types. The unique identifier tag of each base includes a color zone defined by a color selected from a plurality of different colors that correspond respectively to the plurality of different kit types so that each kit type corresponds to one of the plurality of different colors. The unique identifier tag further includes a shape identifier selected from a plurality of different shape identifiers that correspond respectively to the plurality of different kit types so that each kit type corresponds to one of the plurality of different shapes. The color zone and shape identifier can be combined, and the color zone can comprise two different zones located respectively on two different surfaces of the base. The unique identifier tag also optionally includes a machine readable portion such as a bar-code or RFID module.

10 Claims, 11 Drawing Sheets

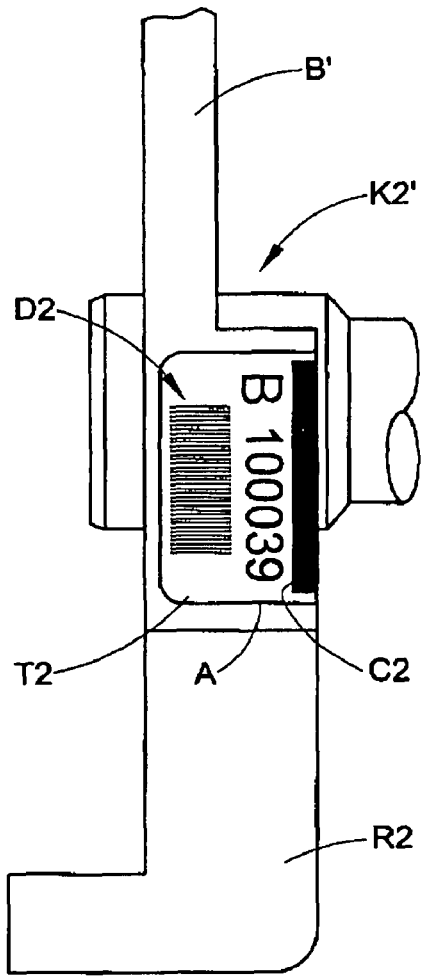
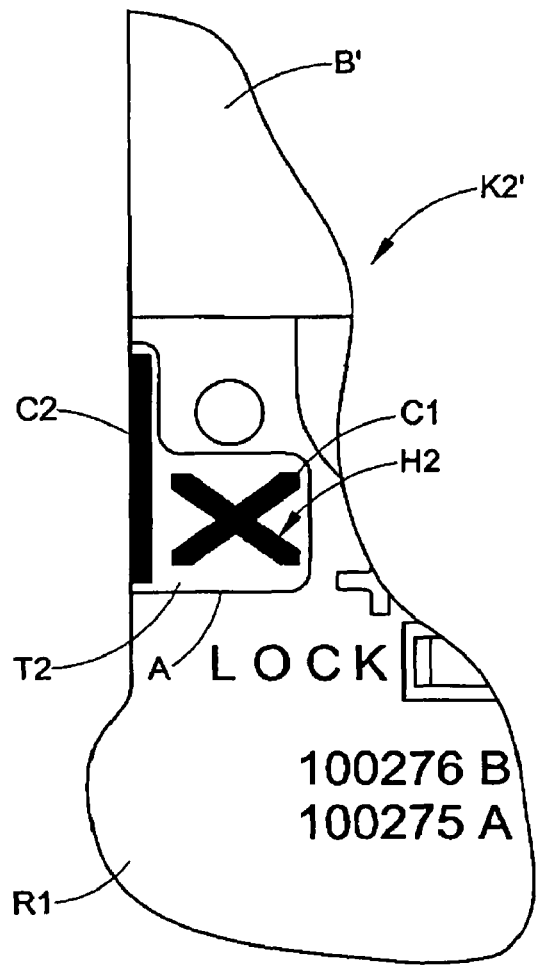
FIG. 6A
FIG. 6B

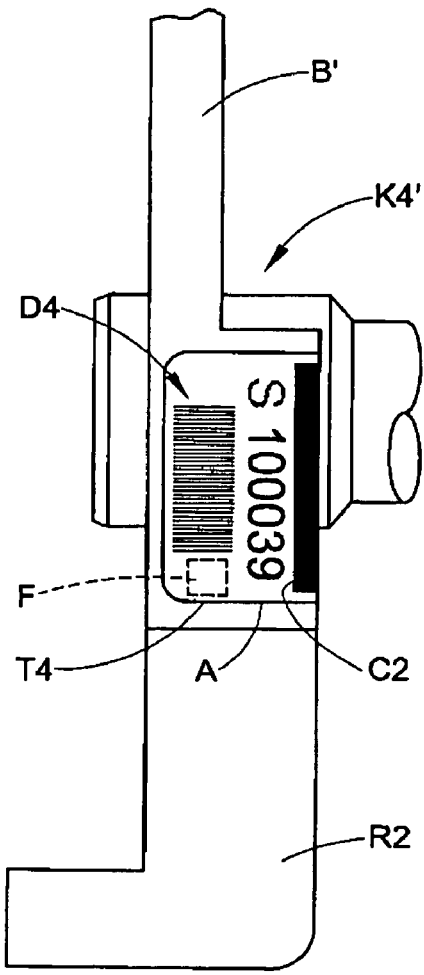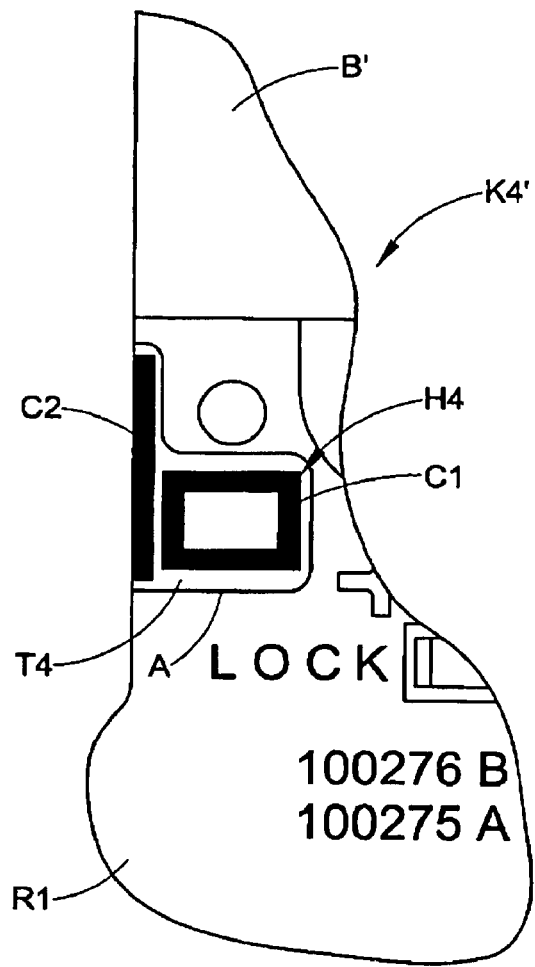
FIG. 8A
FIG. 8B

AUTOMOTIVE PARTS KIT DIFFERENTIATION SYSTEM

CROSS-REFERENCE TO RELATED APPLICATION

This application claims priority from and benefit of the filing date of U.S. provisional application Ser. No. 60/781,271 filed Mar. 10, 2006, the disclosure of which is hereby expressly incorporated by reference.

BACKGROUND

Automotive engines are commonly assembled on an assembly line using parts delivered to the assembly line from a supplier in the form of a kit. Such kits are used, for example, to supply a related series of parts for a camshaft drive system including, e.g., one or more chains, sprockets, chain tensioners and guides, phasers, etc. FIGS. 1A, 1B and 1C respectively illustrate examples of such kits K1, K2 and K3. The kits K1,K2,K3 include a respective plurality of parts P1,P2,P3. Certain parts are common or similar, e.g., all kits K1,K2,K3 include a crankshaft sprocket S1, and chain tensioner C1. Other parts are different—the kit K1 includes a first variable valve timing (VVT) cam phaser sprocket assembly V1, the second kit includes a second variable valve timing cam phaser sprocket V2 that is different from the first VVT sprocket V1, while the kit K3 includes a standard cam sprocket S3. As such, the kits K1,K2,K3 are deemed to be different types based upon the differences in content of parts P1,P2,P3. The parts P1,P2,P3 are supported on a reusable base or frame B that is common to all kits and manufactured from, e.g., molded polymeric (plastic) material. In many cases, multiple such kits, e.g., three or four different but similar kits, are delivered to an installation station of an assembly line, and the human assembler must select the appropriate type of kit K1,K2,K3 to be installed according to the engine being manufactured at a particular time. Given the multiplicity of kits available to the assembler, and given that the kits are sometimes difficult to distinguish based solely upon a visual inspection of the content of parts P1,P2,P3 especially to an untrained assembler, and also given that the reusable base B is common to or similar for all kits K1,K2,K3, mistakes sometimes occur when an assembler selects the incorrect kit and installs the incorrect set of parts P1,P2,P3. This is obviously highly undesirable.

SUMMARY

In accordance with one aspect of the present development, an automotive parts kit differentiation system comprising: a plurality of different types of parts kits, each type of kit comprising a base and a plurality of automotive parts removably contained by the base. The parts contained in each type of kit vary as compared to each other type of kit. Each base comprises a unique identifier tag that identifies said base as being a base for one of said plurality of kit types. The unique identifier tag of each base comprises: a color zone comprising a color selected from a plurality of different colors that correspond respectively to said plurality of different kit types so that each kit type corresponds to one of the plurality of different colors; and, a shape identifier selected from a plurality of different shape identifiers that correspond respectively to said plurality of different kit types so that each kit type corresponds to one of the plurality of different shapes.

In accordance with another aspect of the present development, an automotive parts kit comprises a base and a plurality of automotive parts contained by the base. The base comprises a unique identifier region including: (i) a color zone; and, (ii) a shape identifier, wherein the color zone and shape identifier identify the plurality of automotive parts contained by the base as being one of a plurality of different sets of automotive parts.

In accordance with another aspect of the present development, a method of supplying automotive parts to an assembly line includes locating a set of automotive parts on a base, wherein the set of parts comprises one of a plurality of different sets of parts. The method further includes applying a unique identifier tag to the base to identify the set of automotive parts as one of the plurality of different sets of parts. The unique identifier tag comprises: (i) a color zone; and, (ii) a shape identifier, wherein the color zone and shape identifier identify the set of automotive parts located on the base as being one of the plurality of different sets of parts.

BRIEF DESCRIPTION OF THE DRAWINGS

Preferred embodiments of the present development are disclosed with reference to the accompanying drawings wherein:

FIGS. 6A and 6B are respective side and bottom views that partially illustrate a base for a parts kit K2' including its unique identifier tag T2 (i.e., the parts kit K2' is shown without its associated parts P2';

FIGS. 8A and 8B are respective side and bottom views that partially illustrate a base for a parts kit K4' including its unique identifier tag T4 with an RFID module that identifies the kit as being one of the possible plurality of different kit types (i.e., the parts kit K4' is shown without its associated parts P4';

DETAILED DESCRIPTION

Figure 1A:
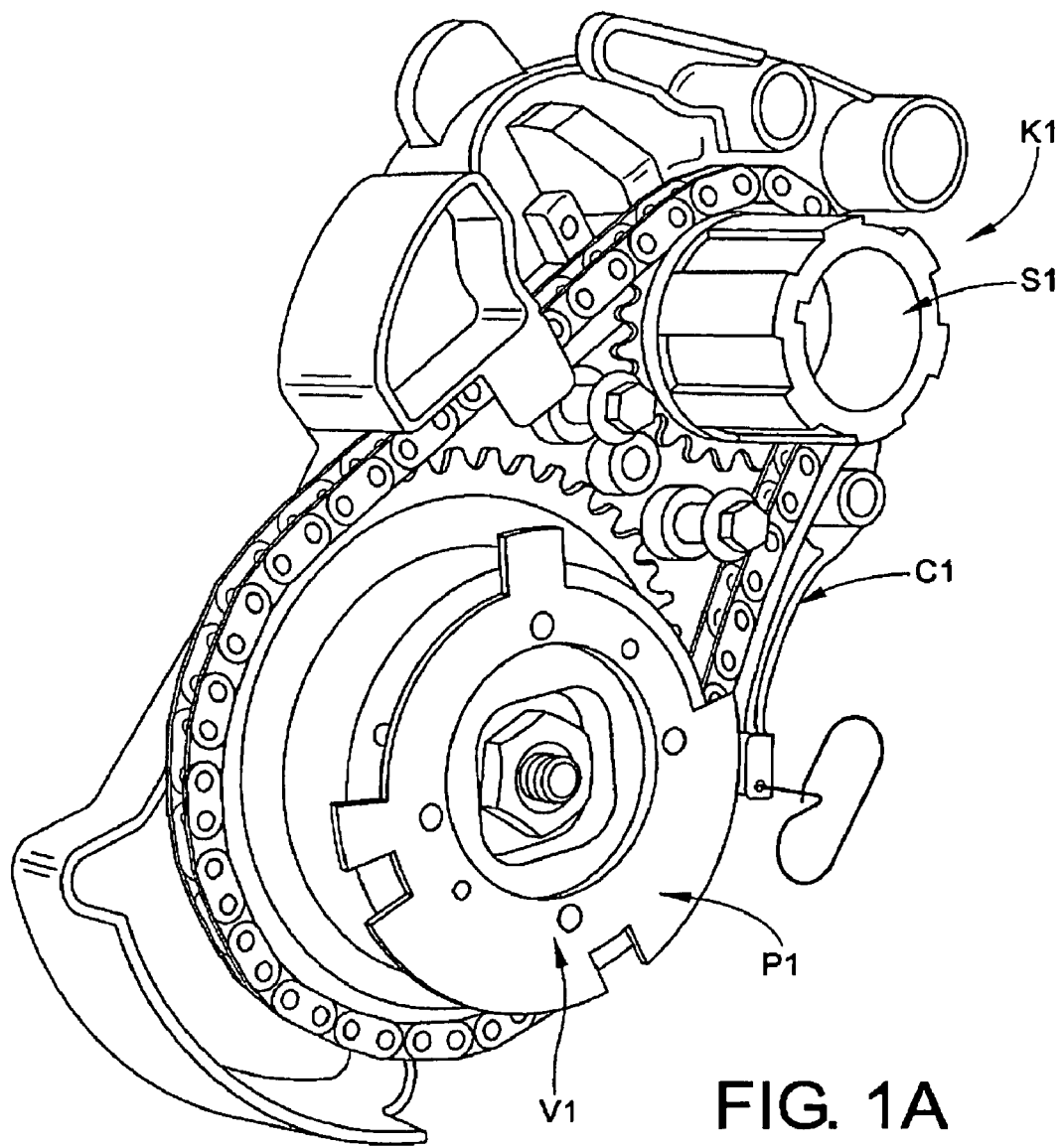
FIGS. 1A, 1B and 1C respectively illustrate examples of three different types of conventional parts kits K1, K2 and K3.
Figure 1B:
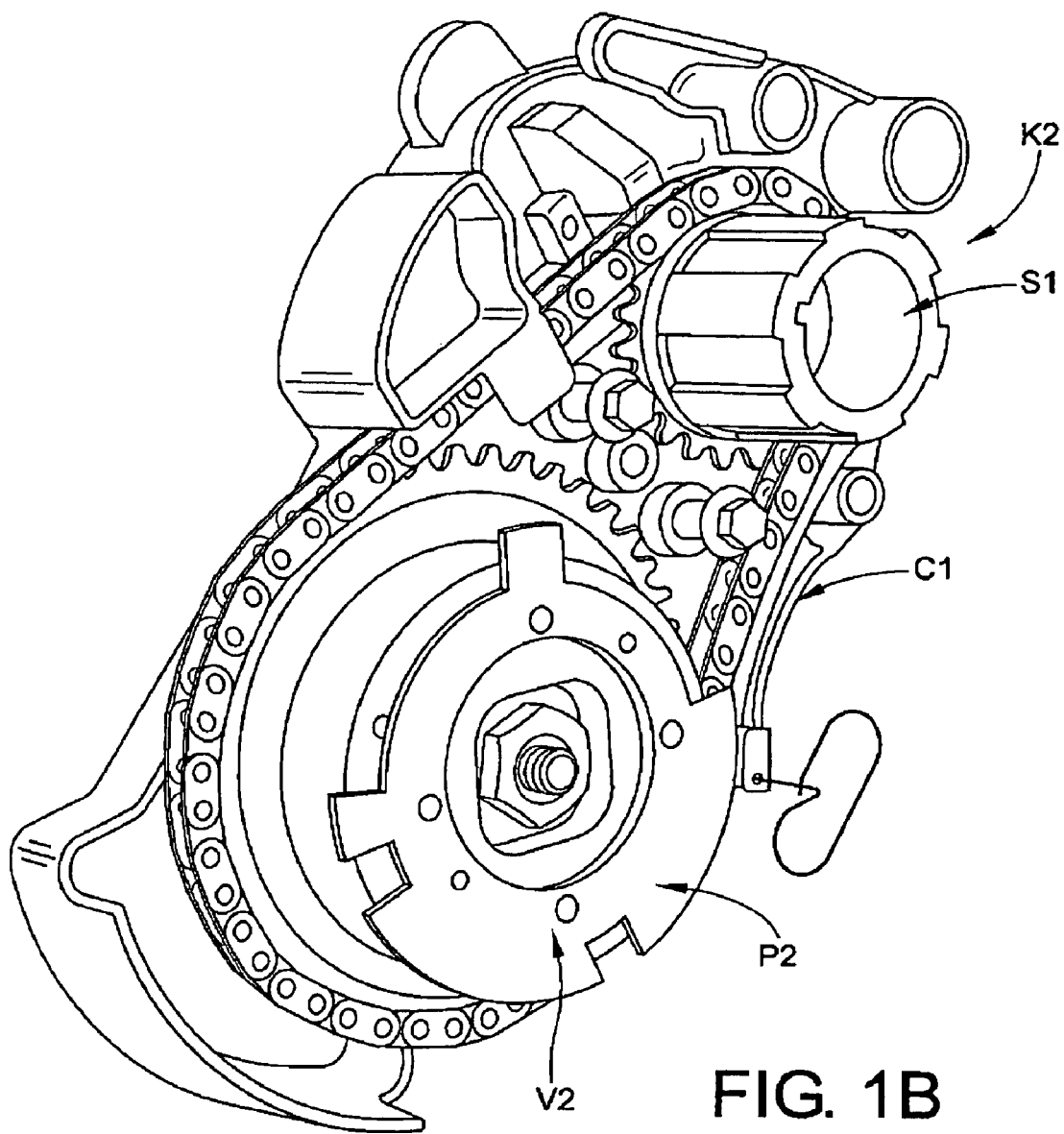
Figure 1C:
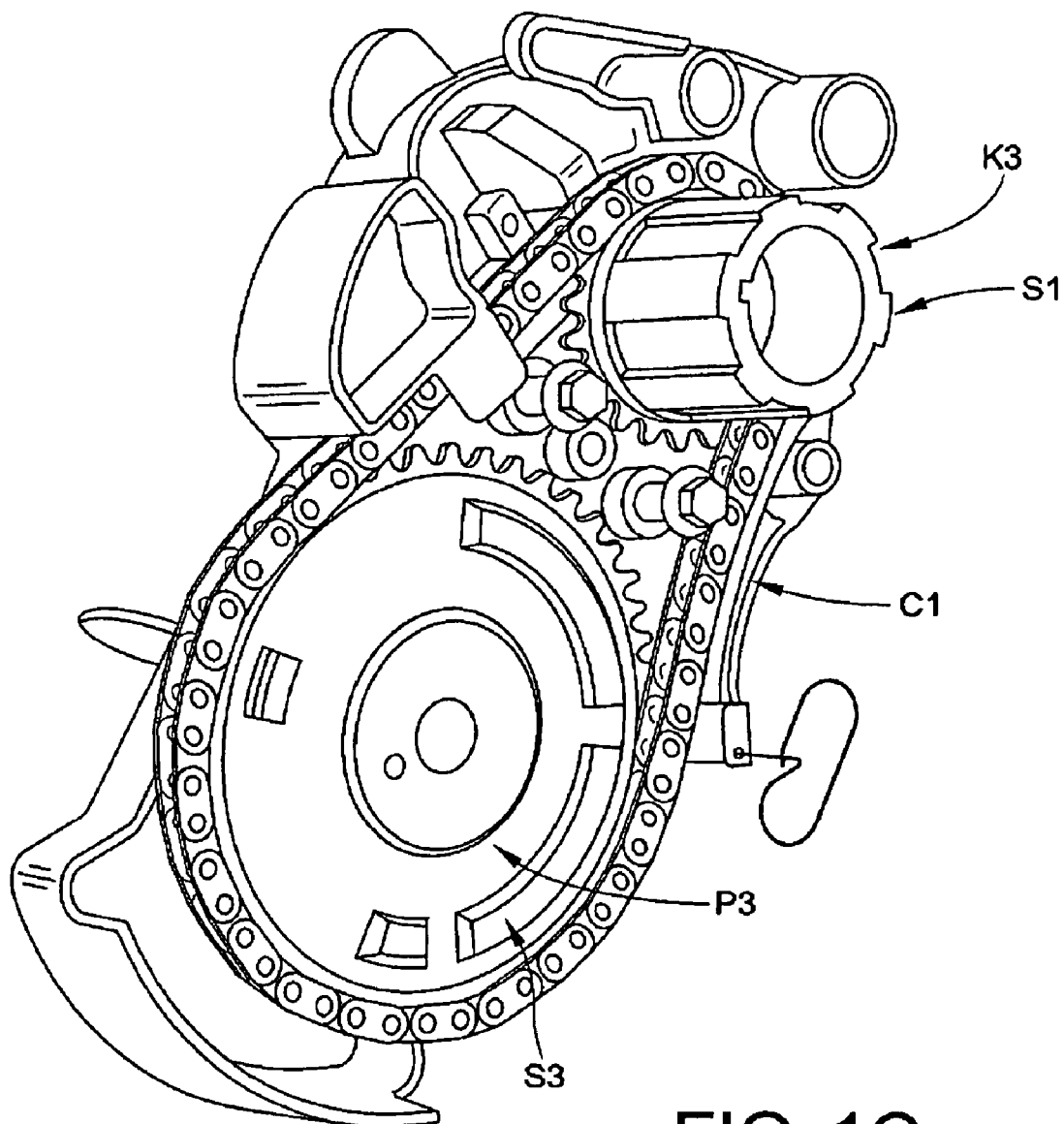
Figure 2:
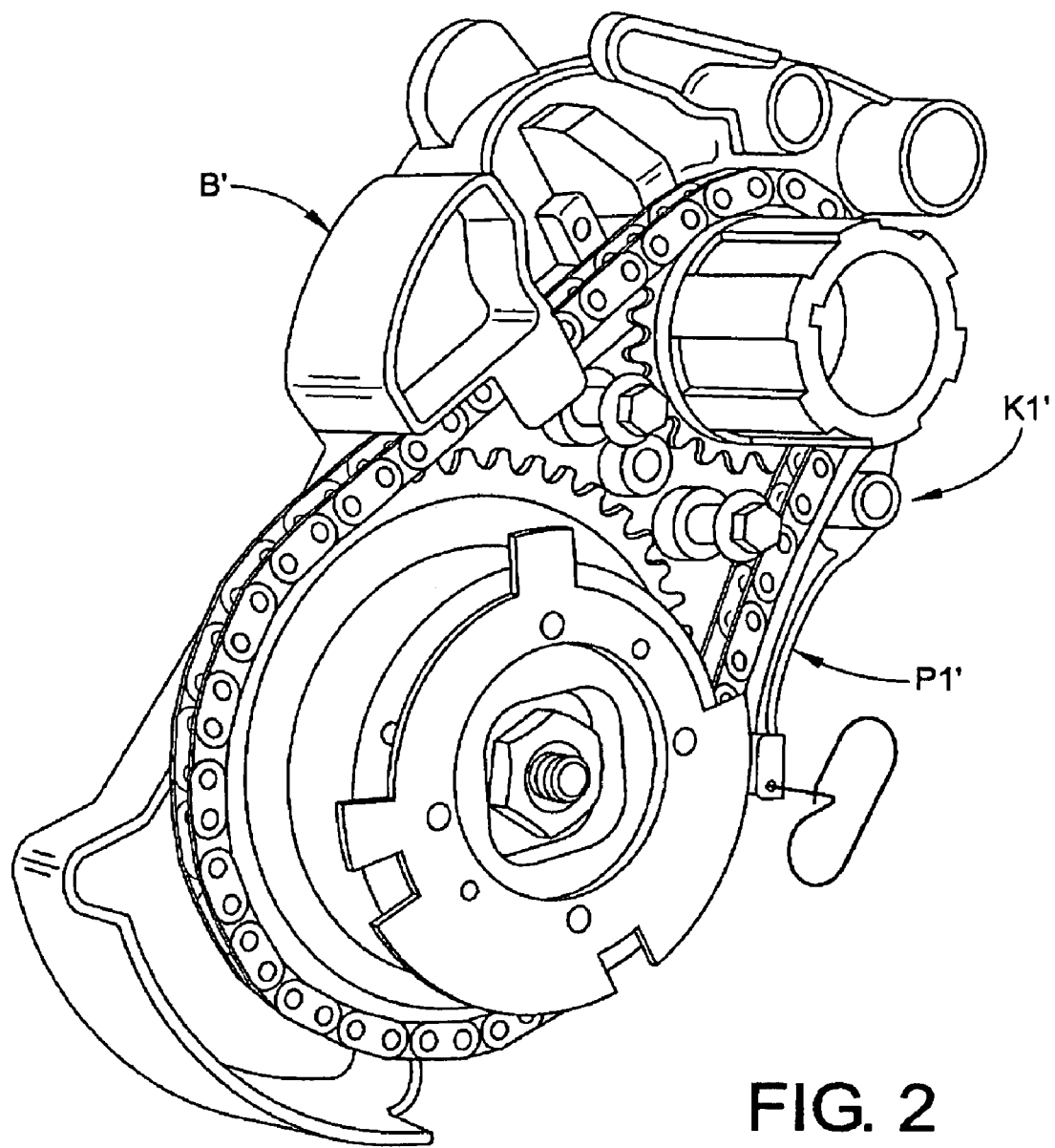
FIGS. 2, 3 and 4 are top isometric views that respectively illustrate examples of three different types of parts kits formed in accordance with the present development.
Figure 3:
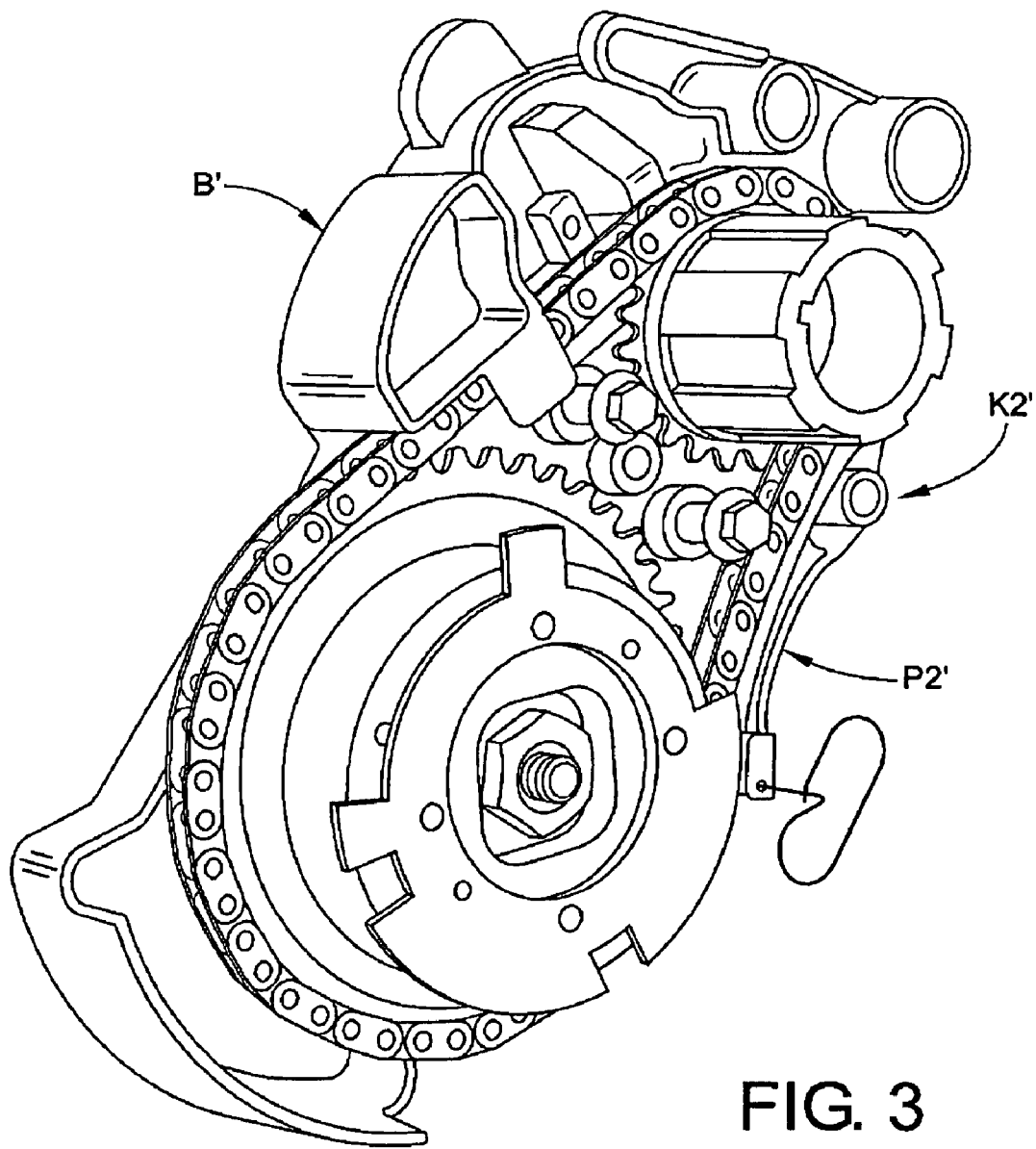
Figure 4:
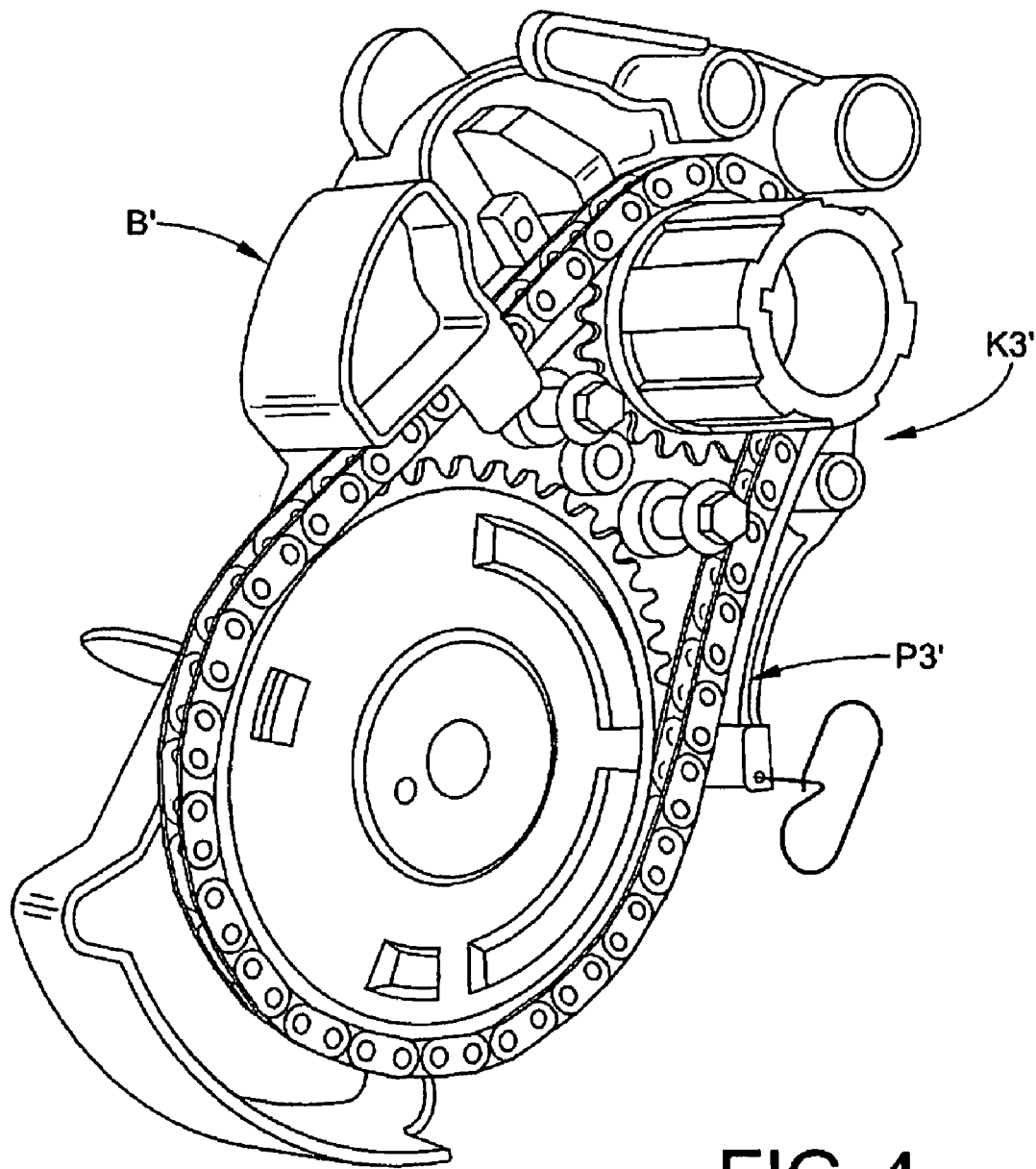
Figure 5A:
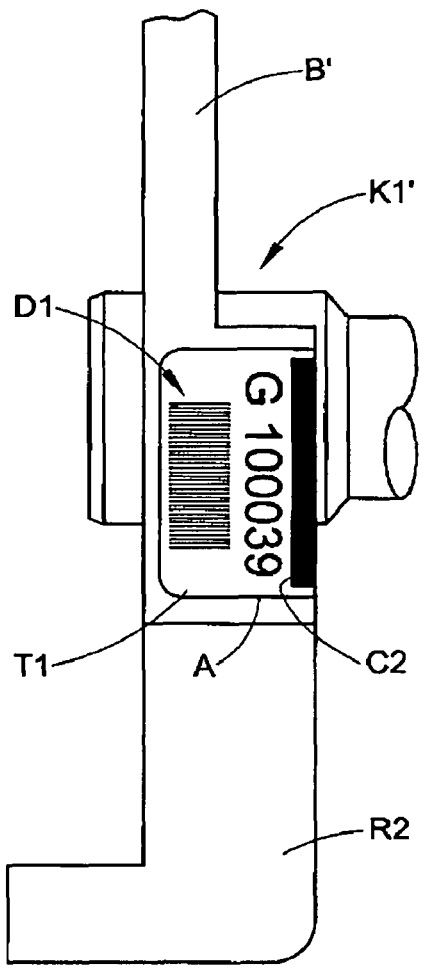
FIGS. 5A and 5B are respective side and bottom views that partially illustrate a base for a parts kit K1' including its unique identifier tag T1 (i.e., the parts kit K1' is shown without its associated parts P1'.
Figure 5B:
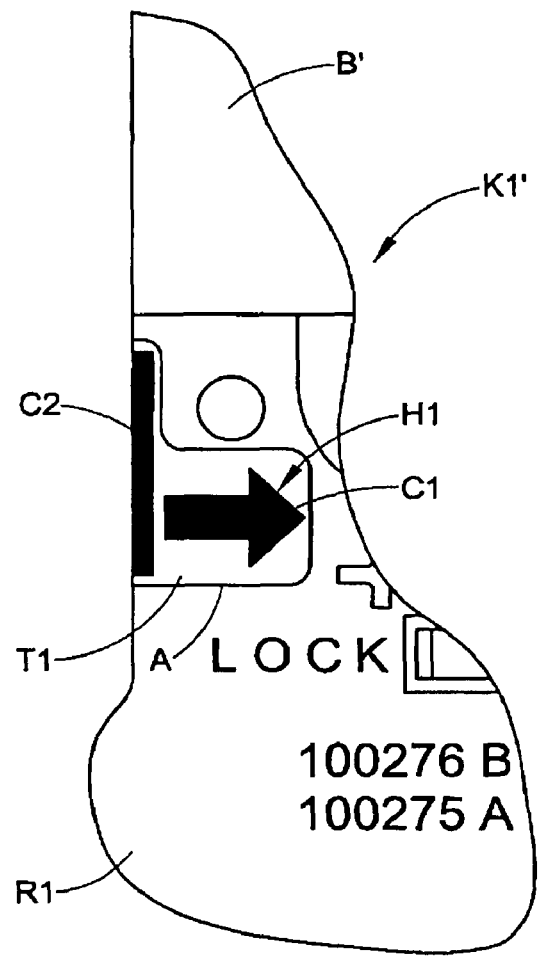
Figure 7A:
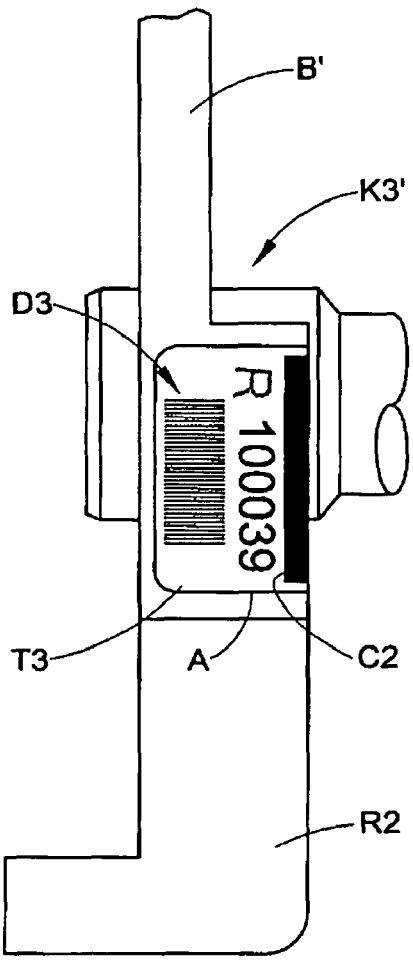
FIGS. 7A and 7B are respective side and bottom views that partially illustrate a base for a parts kit K3' including its unique identifier tag T3 (i.e., the parts kit K3' is shown without its associated parts P3'.
Figure 7B:
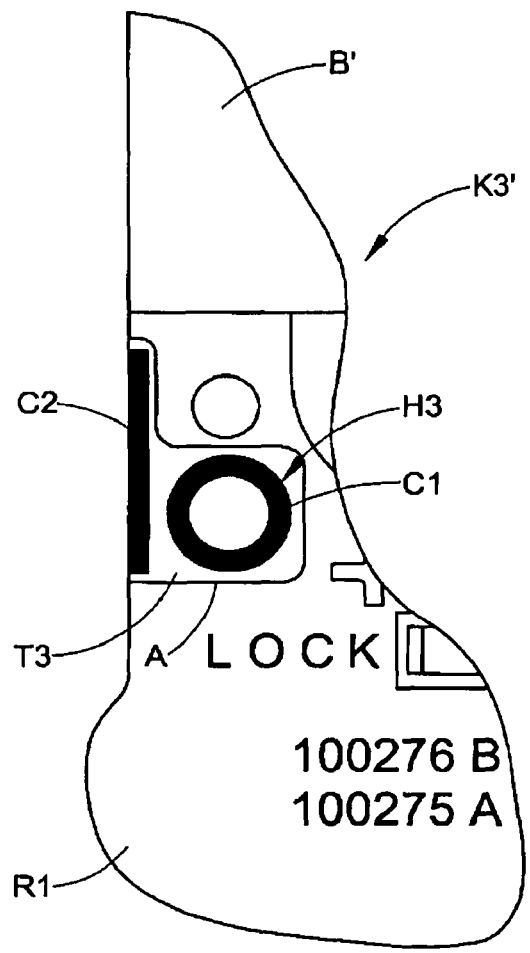

According to the present invention, an automotive parts kit differentiation system is provided to reduce the likelihood of parts kit selection errors as described above. With reference to FIGS. 2, 3 and 4, three kit types K1',K2',K3' are respectively shown and include respective different sets of automotive engine parts P1',P2',P3', with the parts supported in a reusable base B' that is common to or similar for all kits K1',K2',K3'. As such, those of ordinary skill in the art will recognize that a plurality of different types of parts kits are provided (3 types of parts kits in the present example). Except as otherwise shown and/or described herein, the kits K1',K2',K3' and part sets P1',P2',P3' are respectively identical to the kits K1,K2,K3 and part sets P1,P2,P3 described above. The reusable base B' of each kit K1',K2',K3' is identical to the base B described above, except that each base B' comprises an identifier region or tag that is unique for each type of kit K1',K2,K3', i.e., the base B' of each first type of kit K1' includes a first unique identifier tag T1, the base B' of each second type of kit K2' includes a second unique identifier tag T2, and the base B' of each third type of kit K3' includes a third unique identifier tag T3, with each type of kit containing a different set of parts P1',P2',P3', respectively (see also FIGS. 5A, 5B, 6A, 6B, 7A, 7B). Examples of these tags T1,T2,T3 (or generally T) are respectively illustrated in FIGS. 5A, 5B FIGS. 6A, 6B and FIGS. 7A, 7B (note that the bases B' are empty and the part sets P1',P2',P3' are not shown in these views).

In the illustrated embodiment, each tag T1,T2,T3 comprises an adhesive substrate A, that is adhered to the base B', or each tag T1,T2,T3 can be defined by multiple pieces of substrate A adhered to the base. The adhesive is selected so that the tag T1,T2,T3 is semi-permanently affixed to the base B', i.e., so that the tag will not separate from the base B' during ordinary use and handling but so that the tag can be peeled or otherwise manually removed from the base B' if needed.

Each tag T1,T2,T3 includes multiple features that facilitate differentiation of the kits K1',K2',K3'. First, it is noted that each tag includes at least one and preferably first and second color zones C1,C2 that are colored a unique color to designate which set of parts P1',P2',P3' is held in the base B', e.g., blue for kits K1', red for kits K2', and yellow for kits K3'. Secondly, each tag T1,T2,T3 includes a respective unique shape identifier H1,H2,H3 to designate which set of parts P1',P2',P3' is held in the base B', e.g., an arrow shape identifier H1 for kits K1', an "X" shape identifier H2 for kits K2', and a circular or oval shape identifier H3 for kits K3'.

In the illustrated embodiment, it is important to note that the shape identifiers H1,H2,H3 also serve as the first color zone C1, i.e., the shape identifiers H1,H2,H3 are colored the respective unique color that corresponds to the set of parts P1',P2',P3' held in the base B'. With reference to the examples noted above, the shape identifiers H1,H2,H3 are colored blue, red and yellow, respectively, but other colors can be used without departing from the scope and intent of the present development.

Because an assembler might view the kits K1'K2',K3' from an angle or straight-on, it is important that the first and second color zones C1,C2 are adhered to or otherwise located on respective first and second transverse surfaces of the base B' such as the base surface R1 and sidewall surface R2 as shown herein (in the illustrated embodiment, the second color zone C2 is located on both the base surface R1 and sidewall surface R2). As such, an assembler will be able to discern one or both of the color zones C1,C2 for a variety of angles at which he/she is viewing the kit K1',K2',K3'. In the same manner and for the same purpose, the identifier tags T1,T2,T3 can be configured so that the shape identifiers H1,H2,H3 are also adhered to two different transverse surfaces R1,R2 of the base B' (in the illustrated embodiment, the shape identifiers are adhered to only the surface R1 of the base B').

Each tag T1,T2,T3 includes one or more machine-readable (computer-readable) identifiers. As shown herein, the tags T1,T2,T3 includes respective unique bar-codes D1,D2,D3 that respectively identify the kit as being a corresponding one of the kits K1',K2',K3'. The bar-codes D1,D2,D3 are readable by a conventional bar-code reader.

In addition, each tag T1,T2,T3 optionally includes a Radio Frequency Identification (RFID) tag or module F that identifies the kit as being one of the kits K1',K2',K3'. This is shown in FIG. 8 with reference to a tag T4 of a kit K4' (only the base B' of the kit is shown) where the tag T4 includes both a bar-code D4 and an RFID module F. The RFID module is embedded in the substrate of the tag T4 and/or covered by the substrate A of the tag T4 or otherwise connected to the tag T4. The RFID module F, in combination with an RFID reader system including a transceiver, provides for an automatic identification method, relying on storing and remotely retrieving data using a transponder. The RFID module F includes a transponder that receives and responds to radio-frequency queries from the RFID transceiver of the reader system. The RFID module F is preferably passive and requires no internal power source. The RFID module F is provided as part of the identifier tag T1,T2,T3,T4 or is separately adhered or otherwise connected to the base B' of a kit K1'K2',K3',K4'. The tag T4 includes both a bar-code D4 and an RFID module F, but either can be omitted in favor of the other if desired, as each qualify as computer-readable identifiers.

Figure 9:
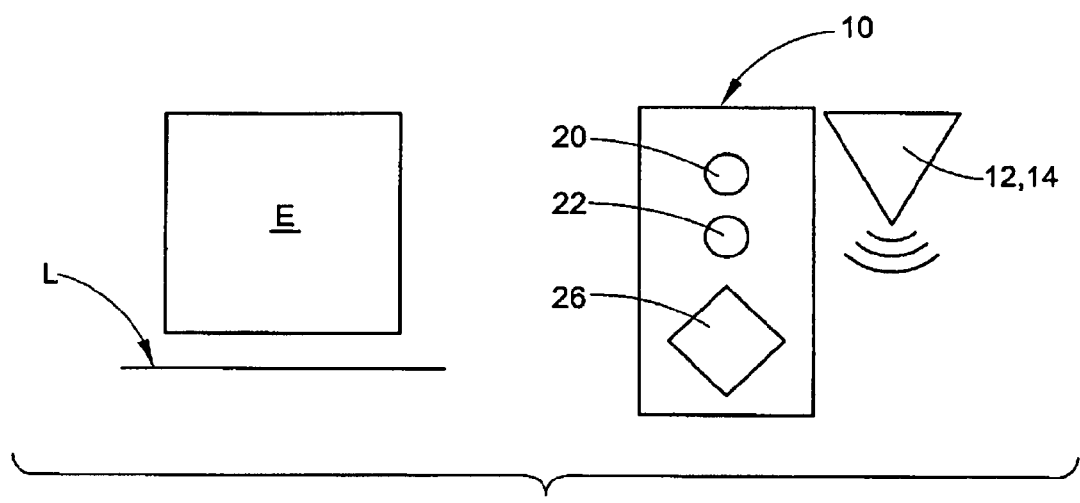
FIG. 9 diagrammatically illustrates an assembly line for assembling automotive engines that is provided with a kit verification station that comprises a bar-code reader and, optionally, an RFID reader system in accordance with the present development.

The computer-readable identifiers, such as the bar-codes D1,D2,D3,D4 and/or RFID tags/modules F facilitate locating/tracking of the kits K1',K2',K3',K4' during shipping and handling. As shown in FIG. 9, for example, an assembly line L for assembling engines E is be provided with a kit verification station 10 that comprises a bar-code reader 12 and/or an RFID reader system 14. In such case, the assembler is able to use the kit verification station 10 to scan the bar-code D1,D2,D3,D4 and/or read the RFID module F of a kit K1', K2',K3',K4' prior to installation of the kit parts on the engine E. In such case, the kit verification station 10 includes visual and/or audible output to provide the assembler with an indication that the proper (or improper) kit K1',K2',K3',K4' has been selected for assembly after the bar-code and/or RFID module has been read/input by the verification station 10. As shown, the kit verification station 10 includes a red light 20 and green light 22, one of which is illuminated after a kit K1',K2',K3',K4' is scanned by the reader 12,14, to indicate incorrect and correct kit selection, respectively. Also, the kit verification station can include an audio output system 26, that provides tones, words, or other audible output to indicate correct or incorrect kit selection when the bar-code and/or RFID tag is read by the verification station 10.

The term "tag" as used herein is intended to encompass a one-piece or a multi-piece tag. It is not intended that the term "tag" be limited to a one-piece construction.

The development has been described with reference to preferred embodiments. It is not intended that the development be limited to the preferred embodiments. Instead, the following claims are to be construed to the broadest possible extent according to their literal terms and/or according to the doctrine of equivalents.

The invention claimed is:

1. An automotive parts kit differentiation system comprising:
   a plurality of different types of parts kits, wherein each type of kit comprises a base and a unique set of automotive parts removably contained by the base, wherein each unique set of parts in each kit is different than sets of parts in other kits, wherein each base comprises a unique identifier tag that identifies said base as being a base for one of said unique set of parts, said unique identifier tag of each base comprising:
   first and second color zones each visually discernable by a human observer and each comprising a same color selected from a plurality of different colors that correspond respectively to different set of parts so that each unique set of parts corresponds to one of said plurality of different colors; wherein said first color zone is located on a base surface of said base and said second color zone is located on a sidewall surface of said base that is transverse to the base surface, and wherein said first and second color zones are visually discernable by a human observer from first and second different viewing angles, respectively; and, a visually discernable shape identifier located on said base surface and selected from a plurality of different shape identifiers that correspond respectively to different sets of parts so that each unique set of parts corresponds to one of said plurality of different shapes, wherein said shape identifier is defined with said same color;

wherein said unique identifier tag further comprises a machine readable portion comprising at least one of:

a machine readable bar-code that identifies said base as being a base for one of said plurality of kit types;

a machine readable RFID module that identifies said base as being a base for one of said plurality of kit types.

2. The automotive parts kit differentiation system as set forth in claim 1, wherein said first color zone is defined at least partially by said shape identifier.

3. The automotive parts kit differentiation system as set forth in claim 1, wherein said first color zone is defined at least partially by said shape identifier.

4. The automotive parts kit differentiation system as set forth in claim 1, further comprising:

a kit verification station comprising: (i) a machine reader for reading said bar-code or RFID module of each unique identifier tag; and, (ii) at least one output device that provides audible or visual output to indicate that a unique identifier tag read by said machine reader is connected to the base of a particular kit type.

5. The automotive parts kit differentiation system as set forth in claim 1, wherein the unique identifier tag connected to each base is removably adhered to the base.

6. An automotive parts kit comprising:

a base;

a unique set of automotive parts contained by the base;

said base comprising a unique identifier region comprising: (i) a first color zone defined by a select color; and, (ii) a first shape identifier, wherein said first color zone and first shape identifier identify said unique set of automotive parts contained by the base as being one of a plurality of different sets of automotive parts; wherein said first shape identifier comprises said select color and is located on a first surface of said base and is viewable by a human observer from a first angle; and (iii) a second color zone also defined by said select color and located on a second surface of said base that is oriented transverse to the first surface of the base and viewable by a human observer from a second angle that is different from the first angle;

wherein said first shape identifier is defined with said select color so as to provide part or all of said first color zone;

wherein said unique identifier region further comprises a machine readable portion comprising at least one of: (i) a machine readable bar-code; and, (ii) a machine readable RFID module, wherein said machine readable portion is adapted to be read by a reader machine and to identify to said reader machine that said unique set of automotive parts contained by the base is one of the plurality of different sets of automotive parts.

7. The automotive parts kit as set forth in claim 6, wherein the unique identifier region is defined by one or more tags that are removably adhered to the base.

8. A method of supplying automotive parts to an assembly line, said method comprising:

locating a unique set of automotive parts on a base, wherein said unique set of parts comprises one of a plurality of unique sets of parts;

applying a unique identifier tag to said base to identify said unique set of automotive parts as one of said plurality of unique sets of parts, wherein said unique identifier tag comprises: (i) first and second color zones each defined by a select color; and, (ii) a shape identifier comprising a select shape defined by said select color, wherein said shape identifier provides at least part of said first color zone, wherein said first and second color zones and said shape identifier identify said unique set of automotive parts located on the base as being one of the plurality of unique sets of parts; wherein said first color zone and said shape identifier are adhered to a first surface of said base to enable viewing of said first color zone and said shape identifier by a human observer from a first angle and wherein said second color zone is adhered to a second surface of said base which is oriented transverse to said first surface of said base such that said second color zone is viewable by a human observer from a second angle that is different from the first angle;

wherein said unique identifier tag further comprises a machine readable portion comprising at least one of: (i) a machine readable bar-code; and, (ii) a machine readable RFID module, wherein said machine readable portion is adapted to be read by a reader machine and to identify to said reader machine that said unique set of parts located on the base is one of the plurality of unique sets of parts.

9. The method as set forth in claim 8, wherein the first color zone and the shape identifier are combined so that the first shape identifier defines at least part of the first color zone.

10. The method as set forth in claim 8, wherein said step of applying said unique identifier tag comprises adhering at least one substrate to the base.

* * * * *